Dec. 19, 1944. V. B. WALLACE Re. 22,582

DRAFTING MACHINE

Original Filed Jan. 9, 1939 3 Sheets-Sheet 1

INVENTOR
VARD B. WALLACE
Harold W. Mattingly
ATTORNEY.

Dec. 19, 1944. V. B. WALLACE Re. 22,582

DRAFTING MACHINE

Original Filed Jan. 9, 1939 3 Sheets-Sheet 2

INVENTOR
VARD B. WALLACE

BY Harrel W. Mattingly

ATTORNEY.

Dec. 19, 1944. V. B. WALLACE Re. 22,582

DRAFTING MACHINE

Original Filed Jan. 9, 1939 3 Sheets-Sheet 3

INVENTOR
VARD B. WALLACE
BY Harold W. Mattingly
ATTORNEY.

Reissued Dec. 19, 1944

Re. 22,582

UNITED STATES PATENT OFFICE 22,582

DRAFTING MACHINE

Vard B. Wallace, Monrovia, Calif., assignor, by mesne assignments, to Vard, Inc., Pasadena, Calif., a corporation of California Original No. 2,226,882, dated December 31, 1940, Serial No. 249,889, January 9, 1939. Application for reissue August 24, 1942, Serial No. 455,964

31 Claims. (Cl. 33—79)

My invention relates to drafting machines and has particular reference to a new and improved construction of the device disclosed in my Patent No. 2,051,115, issued August 18, 1936. This application is a continuation, in part, of my co-pending application, Serial No. 207,015, filed May 10, 1938 and entitled "Drafting machine".

In the art of drafting, it is the common practice to use drafting machines which will support one or more straight edges or scales in such manner that, though they may be moved to various positions over the drawing board or drawing paper, the straight edges may be maintained at a fixed angle relative to a base line on the drawing board.

Two common types of such machines are in general use, one of which is of the pantograph type including a plurality of parallel bars or rods fixed at one end to a base member to be permanently or detachably secured to the drawing board while the opposite ends of the bars or rods are connected to an articulation plate or frame. The second set of parallel bars or rods extend between and are connected to the articulation plate and a scale or straight edge supporting frame, the fixed base, the articulation plate and the frame defining parallelograms so that the frame may be moved to various positions over the drawing board without change of its angular relation relative to a predetermined base line on the board.

The other of these types of machines is known as the "band and pulley" type wherein pulleys mounted, respectively, on the fixed base, the articulation member, and the scale supporting frame are intercoupled by means of endless metal bands in such manner that the scale supporting frame will maintain a definite angular position relative to a base line on the drawing board regardless of the position of the frame upon the board.

In both of these types of machines it is the common practice to mount the scales or straight edges upon a scale support, which is in turn mounted upon the frame to permit of its rotation relative thereto and to thus permit the straight edges or scales to be set at any desired angle relative to the base line and when so set thereafter maintain that same angular position during all movements of the scales or straight edges over the board.

Protractors are also usually provided upon the frame and scale support arranged in such manner as to permit the ready selection of any desired angular relation between the scales and the base line. Again it is common practice in these machines to provide pawls or other spring pressed latching devices receivable in notches or holes when the scales are at certain commonly employed angles relative to the base line and to permit of adjustment of the angular position of the scales by retraction of the pawl, rotation of the scale supporting plate and the insertion of the pawl in a newly selected one of the notches or holes. It frequently occurs, however, that the particular angle at which it is desired to set the scales or straight edges does not coincide with the position of any of the notches or holes and under such circumstances it is desirable that the pawl or latch be locked in a retracted position and that the scale support be clamped in such desired angular position upon the frame.

One of the primary difficulties which have been encountered in the use of such drafting machines having adjustment for the angular positions of the scales has been that, due to the construction of the machines, the scope of rotational movement between the scale supporting plate and the parallel mechanism frame has been limited to a relatively small portion of a complete circle whereas it is frequently desired to move the scales to positions beyond this limit; namely, at any position throughout a complete circle. Again another difficulty which has heretofore been encountered has been that the pawls and releasing devices employed for releasing the pawls from their notches or holes have been so inconveniently and awkwardly located that it has been necessary for the draftsman using the machine to drop pencils, dividers or other instruments which he is then using and to employ both hands for the adjustment or repositioning of the scales and frame.

It is therefore an object of my invention to provide a mounting for the scales on parallel mechanism drafting machines in which the scales may be rotated through a complete 360° of rotation relative to the parallel mechanism frame.

Another object of my invention is to provide a device of the character set forth in the preceding paragraph which is equally adaptable to either the parallel bar type of drafting machine and to the band and pulley type machine.

Another object of my invention is to provide a scale support and parallel mechanism frame mounting in which a pawl or latch may be employed to adjustably fix the angular relation between the supporting plate and the frame and in which release devices for the latch are so conveniently mounted that a person manipulating the machine may with a single hand release the latch and turn or adjust the scales to the new desired position.

Another object of my invention is to provide a mechanism of the character set forth in the preceding paragraph wherein a simple locking means is provided for locking the pawl or latch in its "free" position whenever it is desired either to move the scales to some uncommon angle for which no notch or hole is provided, or when it is desired to leave the scales in a condition to be freely rotated relative to the parallel mechanism frame.

Other objects and advantages of my invention will be apparent from a study of the following specifications, read in connection with the accompanying drawings, wherein.

Figure 1:
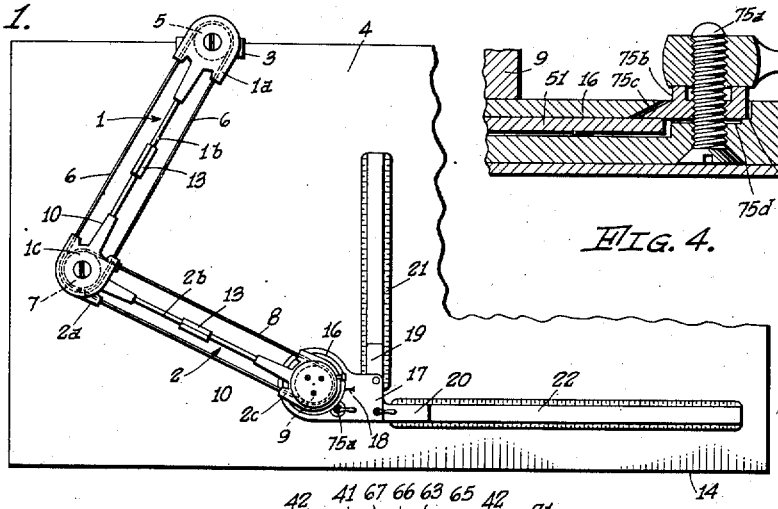
Fig. 1 is a fragmentary plan view illustrating one form of the protractor head of my invention as being employed on a drafting machine of the endless band type.

Referring to the drawings, I have illustrated in Fig. 1 a typical "endless band" type of drafting machine which includes a pair of arms or struts 1 and 2, each of which is constructed to include a pivot head at each of its ends held apart by an extensible and contractible rod mechanism. The arm 1 includes a pivot head 1a at one end of the rod 1b which in turn carries the pivot head 1c at its opposite end. A mounting bracket 3 secured or clamped upon the edge of a drawing board 4 constitutes a pivotal mounting for arm 1, upon which bracket the pivot head 1a of that arm may be rotatably secured for movement in a plane parallel to the surface of the board. A pulley 5, rigidly secured to the bracket 3 constitutes one of a pair of pulleys about which an endless band or belt 6 extends, the other pulley 7 of the pair being rotatably mounted upon the pivot head 1c of arm 1. Thus, as arm 1 is rotated about the bracket 3 the pulley 7 will maintain the same angular position relative to the board as that of the fixed pulley 5.

An arm 2 likewise includes a pivot head 2a pivotally connected to the head 1c of arm 1 for rotation relative thereto in a plane parallel to the board, head 2a being mounted at one end of a rod 2b, the opposite end of which carries a pivot head 2c.

A second endless band or belt 8 extends about a pair of pulleys on arm 2, one of these pulleys indicated at 9 being rotatably mounted upon the head 2c of arm 2 while the other may be the same pulley 7 which forms a part of arm 1. Thus, as either or both of the arms or struts 1 and 2 are moved over the board, the pulley 9 will always maintain a fixed angular position relative to a base line on the board.

As is fully shown and described in my aforementioned patent, No. 2,015,115, adjustment of the tension exerted upon the band 8 is permitted by forming the pivot heads with shanks 10 having sockets 11 formed therein to receive the ends of the rod 1b, at least one of the sockets having an adjusting screw 12 therein which threadedly engages the rod 1b such that by rotating the rod about its longitudinal axis the effective spacing of the pulleys 7 and 9 may be changed. A similar construction embodied in arm 1 may be used to adjust the tension of the band 6. If desired, a knurled or hexagonal handle portion 13 may be formed upon rods 1b and 2b to facilitate turning them.

It will be readily observed that the aforementioned pulleys 5, 7 and 9 and the endless bands 6 and 8 cooperating therewith function in combination with the pivoted joints of the struts 1 and 2 to maintain the pulley 9 in a fixed angular location relative to the pulley 5 and the drawing board 4 so that while the pulley 9 may be moved to any desired position on the drawing board 4, it will at all times maintain a fixed angular relationship to the base line 14 while so doing and pulley 9 may constitute a support for scales or straight edges to be used in making drawings on the board 4.

I provide a protractor plate 16 which is securely attached to the pulley 9 and rotatably supports co-axially therewith a head plate 17 which is provided with a protractor index 18. The head plate 17 is provided with suitable mounting members 19 and 20 for removably supporting drafting scales or straight edges 21 and 22. The scales 21 and 22 are preferably disposed at right angles relative to each other, and the head plate 17 which carries these straight edges is preferably made readily rotatable with respect to the protractor 16 and pulley 9 attached thereto, so that the scales 21 and 22 may be positioned at any desired angle relative to a base line 14 on the board 4.

Figure 2:
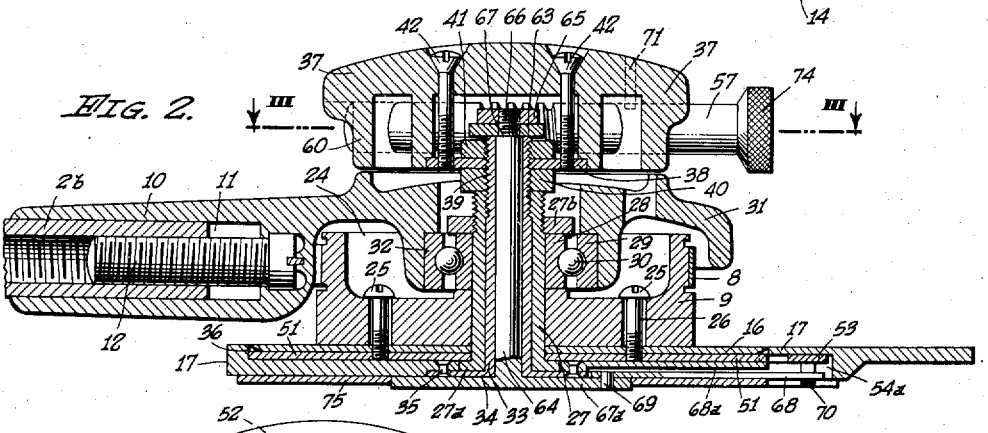
Fig. 2 is a vertical section taken substantially along the line II—II of Fig. 1 and illustrating the construction of the protractor head shown in Fig. 1.
Figure 3:
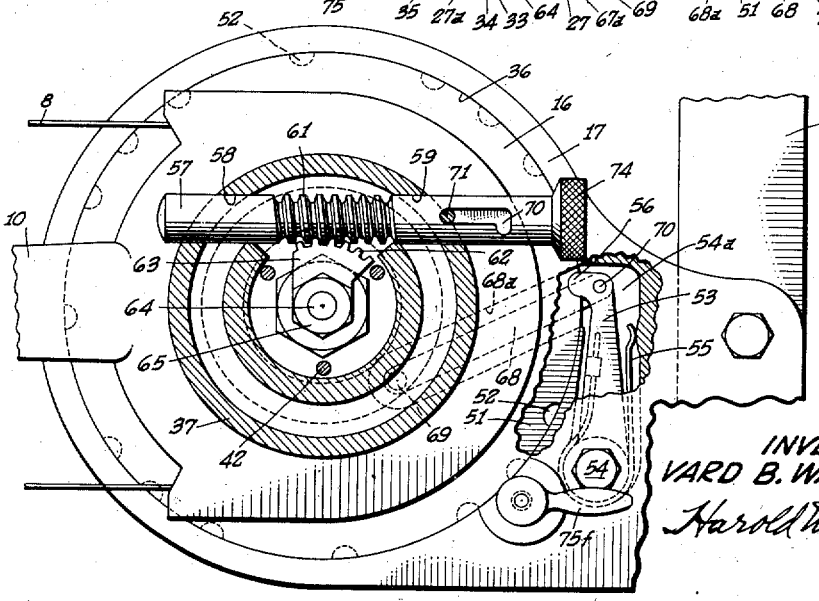
Fig. 3 is a horizontal section taken as indicated by the line III—III of Fig. 1 to show additional details of construction of the protractor head and release mechanism.

As illustrated in Figs. 2 and 3, the pulley 9 may be rigidly secured to the protractor plate 16 by providing a recess 24 therein which will accommodate the protruding portion of an attaching means which, as shown in Fig. 2, may comprise machine screws 25 passed through suitable openings 26 in the body portion of the pulley 9 and threadedly engaged with the protractor plate 16. The assembled pulley 9 and protractor plate 16 may be secured on a sleeve 27 which extends upwardly from the protractor plate 16 by providing a hub 27a for engaging the underside of the protractor plate 16 and a means to be described hereinafter for forcing the pulley 9 and the protractor plate 16 against said hub. An inner race 28 of a ball bearing is preferably mounted on the central portion of the sleeve 27, and an outer race 29 of said ball bearing is rotatably secured to the inner race as by means of balls or rollers 30 and secured in a fixed position relative to a body portion 31 of the shank 10 as by providing a press fit between the outer race 29 and a recess 32 provided therefor. I provide a nut 27b which is threaded upon the upper end of the sleeve 27 and arranged to clamp the inner race 28, the pulley 9 and the protractor plate 16 between said nut and the hub 27a so as to securely lock each of these elements in a fixed position relative to each other.

In order that the head plate 17 and the scales 21 and 22 attached thereto may be rotatably mounted with respect to the protractor plate 16 to permit the scales to be adjusted or set in different desired angular positions relative to the base line 14, I provide another sleeve 33 which is inserted within the aforementioned sleeve 27 and adapted to rotate therein. The sleeve 33 is provided with a flanged base portion 34 which is secured to the head plate 17 as by means of suitable attaching means 35 which may be, as illustrated in Fig. 2, headless rivets. The head plate 17 is provided with a circular recess 36 adapted to contain the protractor plate 16 so that the upper surfaces of the protractor plate 16 and the head plate 17 may lie in the same plane while the body portion of the head plate 17 may pass under the protractor plate 16 so as to establish the aforementioned engagement between the head plate 17 and the flanged portion 34 of the inner sleeve 33.

To assist the draftsman in moving the scales over the board 4 and to make such rotational adjustment between the scales and pulley 9 as he may desire, I provide a handle or control knob 37 securely attached to the upper end of the inner sleeve 33 as by providing a mounting plate 38 which may be threadedly engaged with a threaded upper portion 39 and locked in the desired position by means of jamb nuts 40 and 41. The control knob 37 may be attached to the mounting plate 38 as by means of machine screws 42 engaging the knob 37 and threadedly engaged with the mounting plate 38. An operator may therefore, by grasping the knob 37, rotate the head plate 17 relative to the protractor plate 16 (protractor plate 16 being in a fixed angular position relative to the base line 23) so as to establish any desired angular relationship between the scales 21 and 22 attached to the head plate 17 and the base line 23.

In order that the protractor plate 16 and the head plate 17 may be automatically secured in a fixed position relative to each other at certain specified and frequently used angular settings of the scales 21 and 22, and to accurately establish these angular settings without requiring great care in operation, I provide a spring actuated such angular positions and for holding the protrator plate 16 relative to the head plate 17 at such angular positions and for holding the protractor plate 16 in such position. This mechanism includes a notch plate 51 which is disposed immediately below the protractor plate 16 and securely attached thereto by the aforementioned fastening means 25. The notch plate 51 is provided with a plurality of notches 52 disposed about the periphery of the notch plate in such location that when said notches register with a pawl 53, the scales 21 and 22 will occupy one of the aforementioned frequently used angular positions. Such angular positions may include a position in which the scale 22 is disposed parallel to the base line 23 and other positions at angles of 15, 30, 45, 60 and 90 degrees thereto.

The pawl 53 is pivotally secured to the head plate 17 as by means of a pin or bolt 54 and confined in a recess 54a provided therefor in the head plate 17. A spring 55 is provided, which is arranged to normally urge the pawl 53 toward the notch plate 51 so that whenever the head plate 17 is rotated to a position in which a notch engaging end 56 of the pawl 53 registers with one of the notches 52, the spring 55 will urge the pawl 53 into engagement with that notch so as to intertie the head plate 17 to the notch plate 51 and the protractor plate 16 attached thereto.

I prefer to locate the pivot point 54 approximately on a line tangential to the notch plate 51 at the point of engagement of the pawl 53 with the notch plate 51 so that any tendency of the head plate 17 and the pawl 53 carried thereby to rotate relative to the notch plate 51 will provide no component of force tending to dislodge the pawl 53 from engagement with the notch 52 of the notch plate 51.

In order that the pawl 53 may be readily and easily disengaged from the notch plate 51 by the draftsman employing the machine and in order that such disengagement may be effected through the draftsman's use of the same hand as he uses to rotate the control knob 37, I provide a mechanism which includes a plunger 57 which is slidably mounted in holes 58 and 59 provided in a downwardly extending flange portion 60 of the control knob 37. The plunger 57 is provided with cylindrical gear rack teeth 61 which are arranged to be operably engaged with similar gear teeth 62 provided in a gear sector 63. The gear sector 63 is attached to a shaft 64 which is inserted within the inner sleeve 33 and is rotatable relative thereto. The gear sector 63 is attached to the shaft 64 by means of a nut 65 which operates in conjunction with a threaded end 66 of the shaft 64 to force the sector 63 into intimate engagement with a shoulder 67 provided on the upper end of the shaft 64. The shaft 64 is provided with a horizontal flange portion 67a which is disposed immediately below the previously described flange portion 34 of the inner rotatable sleeve 33.

I provide a connecting link 68 which is confined in a recess 68a in the head plate 17 and pivotally secured to the flange 67a as by means of a pivot pin 69 located near the periphery of the flange 67a. The other end of the link 68 is pivotally secured to the notch engaging end 56 of the pawl 53 as by means of a suitable pivot pin 70.

I prefer to arrange the previously described parts in such a manner that should the plunger 57 be moved to the left, as illustrated in Fig. 3, to rotate the shaft 64, the link 68 will be moved thereby in such a direction as to move the pawl 53 away from the notch plate 51 against the restoring action of the spring 55. It will be observed that this operation of disengaging the pawl from the notch with which it is engaged will then allow the draftsman to change the relative location of the head plate 17 with respect to the protractor plate 16 by turning the control knob 37 in a manner previously described. It also follows, if during this operation the draftsman removes the pressure from the plunger 57 that as soon as the head plate 17 and the protractor plate 16 are rotated relative to each other to a position in which the notch engaging end 56 of the pawl 53 registers with another of the notches 52, the spring 55 will force the pawl 53 into engagement therewith and through the interaction of the link 68 and the gear sector 63 return the plunger 57 to the position it occupied prior to the above described operation.

In performing certain drafting operations it may be desired to have the scales freely rotatable to various positions without interference by the locking pawl 53. I have accordingly provided means for holding the operating plunger 57 in pawl releasing position as by forming a projection 71 on the control knob 37 which depends downwardly and is arranged to engage a bayonet recess 72 provided in the upper surface of the plunger 57. A thumb piece 74 is formed on one end of the plunger 57 and is preferably cylindrical in shape so that it may be grasped by the draftsman and rotated after it has been moved to disengaged position so as to cause the projection 71 to engage a toe portion 73 of the bayonet recess 72 and prevent the operation of the spring 55 from restoring the parts to their original or non-operated position.

I prefer to provide a bottom cover plate 75 which is disposed below the head plate 17 and substantially in the plane of the flange 67a so as to provide a cover for the link 68 and the pawl 53. The cover plate 75 may be attached to the head plate 17 in any suitable manner. It will be observed that by utilizing the arrangements of parts described hereinbefore that the draftsman may, by placing the plunger 57 in an operated position so as to disengage the pawl 53 from the notches 52 provided in the notch plate 51, rotate the head plate 17 and the scales attached thereto to any desired angular position relative to the base line 23.

It will be further noted that this operation of rotating the scales 21 and 22 may be continued throughout a full circle of 360 degree movement without interfering or coming into contact with the parallel mechanism attached to the shank 10 and the body portion 31 thereof.

Figure 4:
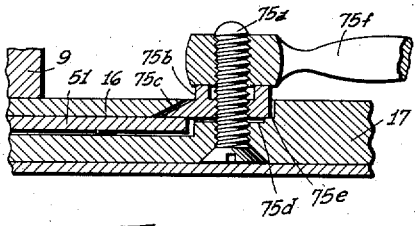
Fig. 4 is a vertical section taken along the line IV—IV of Fig. 3 and illustrating a clamping mechanism employed for locking the protractor head in any set position.

In order that the head plate 17 may be securely locked in any desired angular position relative to the protractor plate 16, particularly when such desired position is different from the positions provided by the previously described pawl type locking device, I provide a clamping mechanism which, in the preferred form of my invention, is constructed as illustrated in Fig. 4. The clamping mechanism includes an upstanding threaded rod or machine screw 75a which is threadedly secured to the head plate 17 and arranged to extend thereabove and be loosely encircled by a clamping member 75b which is provided with a tapered face 75c arranged to extend beneath a similar beveled edge of the protractor plate 16 and over the upper surface of the notch plate 51. The clamping member 75b is non-rotatably seated in a recess 75d and adapted to have its outer edge rest upon a projection 75e disposed in the bottom of said recess so that a nut threaded on to the screw 75a may be rotated as by a handle 75f to force the clamping member 75b downwardly. Downward movement of the clamping member 75b will cause it to pivot on the projection 75e and clamp the edge of the notch plate 51 between the member 75b and the head plate 17. Inasmuch as the notch plate 51 is rigidly secured to the protractor plate 16, it will be seen that this operation will lock the protractor plate 16 and the head plate 17 securely together.

Figure 5:
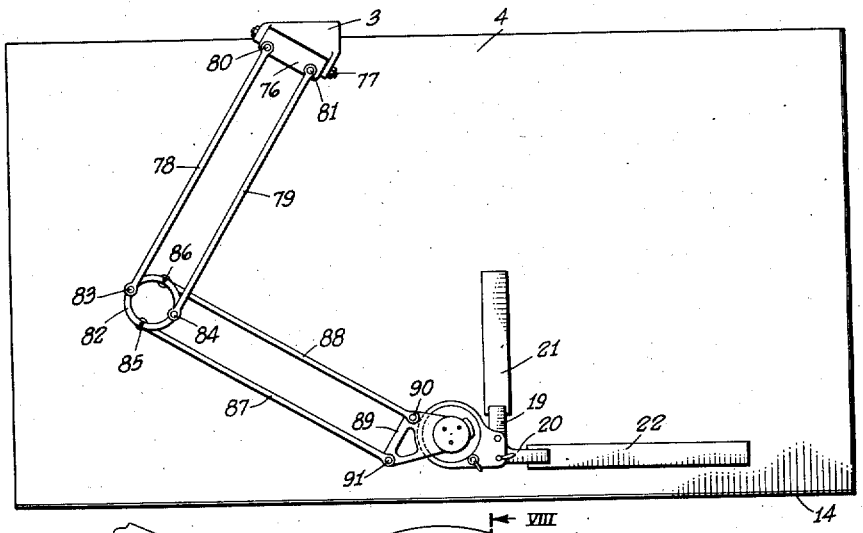
Fig. 5 is a plan view similar to Fig. 1 but illustrating the application of a protractor head embodying the principles of my invention to a drafting machine of the parallel arm or rod type.

I have illustrated in Fig. 5 a second type of drafting machine which also employs a protractor and scale supporting head of my invention. This machine may be attached to the drawing board or table 4 by means of the supporting or clamping bracket 3. A hinge member 76 is pivotally attached to the bracket member 3 as by means of a pivot 77 which lies substantially in the plane of the drawing board 4. This type of parallel mechanism includes a pair of arms 78 and 79 which are pivotally attached to the hinge member 76 as by means of pivots 80 and 81. The arm members 78 and 79 extend from the hinge member 76 in a parallel relation relative to each other and are separately and independently pivotally secured to a ring member 82 as by means of pivot pins 83 and 84. The pins 83 and 84 are spaced apart a distance equal to the spacing between the pivots 80 and 81 and the rod members 78 and 79 are made of equal length as measured between the pivot points provided at each end thereof. The ring member 82 carries a second pair of pivot pins 85 and 86 which are disposed in right angle locations relative to the locations of the previously described pivot pins 83 and 84, and pivotally attach to said ring member 82 another pair of parallel rod members 87 and 88. The rod members 87 and 88 are also pivotally attached to a protractor head frame member 89 as by means of pivot pins 90 and 91.

Figure 7:
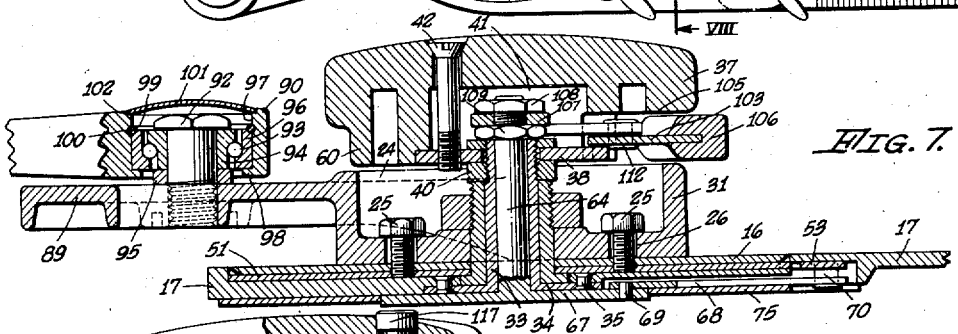
Fig. 7 is a vertical section taken along the line VII—VII of Fig. 6 and showing additional details of construction of the release mechanism employed in the type of protractor head illustrated in Fig. 6.

The pivot pins 80, 81, 83, etc., may be constructed in the same manner as the construction of pivot point 90 which is illustrated in Fig. 7. Such pivot point may include a bolt or other suitable fastening means 92 which is threadedly engaged with the protractor head frame member 89 and is employed to secure thereto a ball bearing 93 through clamping action exerted on the inner race 94 thereof between the head of the bolt 92 and a washer 95 disposed between the inner race 94 and the protractor head frame member 89. An outer race 96 of the ball bearing 93 is secured in a recess 97 provided in the end of the arm 88 by means of a turned in flange 98 provided around the lower edge of the recess 97 and further by means of a snap ring 99 which mutually engages an annular recess 100 and the outer race 96 of the ball bearing 93. I prefer to employ a snap cover 101 which is carried by a ledge 102 in the recess 97 for covering the bolt 92 and providing a finished exterior appearance.

In view of the fact that each rod of a pair is of the same effective length as the companion rod, and in view of the fact that the spacing between the pivot pins 80 and 81 is made the same as the spacing between the pivot pins 83 and 84 and that the spacing between the pivot pins 85 and 86 is made equal to the spacing of the pivot pins 90 and 91, it follows that the protractor head frame member 89 may be moved in a translatory fashion over the surface of the drawing board 4, such movement being permitted by the previously described pivoted joints, while being maintained in a fixed angular position relative to the base line 14 thereof through the pantographic action of the aforementioned parallelograms. The hinge member 76 and its associated pivots 77 are provided so that the drafting machine may be moved in a direction normal to the surface of the drawing board 4 for the purpose of removing a drawing therefrom.

Figure 6:
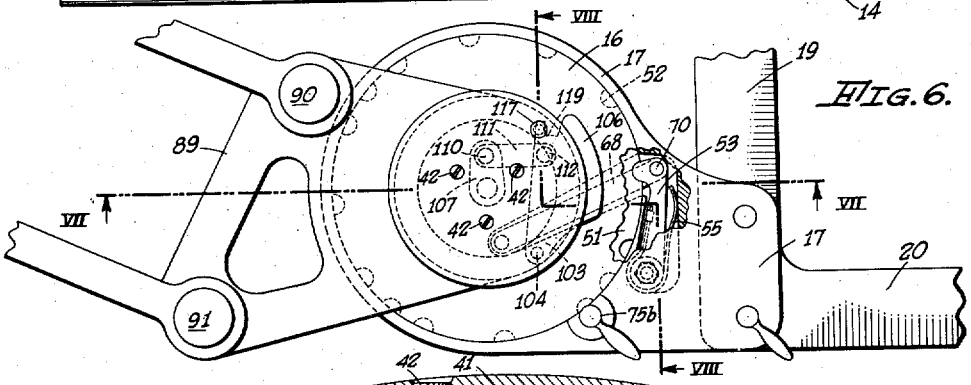
Fig. 6 is an enlarged plan view of an alternative form of protractor head with certain parts broken away to show the construction of the release mechanism.

As illustrated in Figs. 6 and 7, the protractor head of this embodiment of my invention includes the protractor plate 16 and the head plate 17, the latter carrying supporting members 19 and 20 to which are attached the drafting scales or straight edges 21 and 22. In order that the protractor plate 16 may be maintained at a fixed angular position with respect to the base line 14, I securely attach said protractor plate 16 to the body portion 31 of the protractor head frame member 89 as by means of screws or bolts 25. The heads of the screws 25 are included in the recess 24 formed in the body portion 31 and the screws extend through suitable holes 26 and into threaded engagement with the protractor plate 16. It follows therefore that the protractor plate 16 must be maintained in a fixed angular position relative to the base line 14 since the protractor head frame member 89 to which it is securely attached is, as has been previously shown, maintained in such fixed location.

In order that the head plate 17 and the scales 21 and 22 carried thereby may be manually rotated to any desired angular position relative to the base line 14, I secure the head plate 17 to the sleeve 33 and attach the control knob 37 thereto in the same manner as described hereinbefore.

In this form of the device of my invention, I also incorporate the spring pressed pawl 53 which is arranged to engage each of the plurality of notches 52 provided in the notch plate 51 disposed immediately below and attached to the protractor plate 16. The mechanism for operating the pawl 53 is similar to that previously described in that it includes the shaft 64 which is operably connected to the pawl 53 by the link 68.

Rotation of the shaft 64 will actuate the link 68 so as to move the pawl 53 out of engagement with the notches 52 against the action of the spring 55 opposing this movement. In this embodiment of my invention, illustrated in Figs. 5 through 8, I prefer to employ an alternative means for rotating the shaft 64. This means may include a lever 103 which is pivotally mounted as by means of a pivot pin 104 in a recess 105 provided in the downwardly depending flange portion 60 of the control knob 37.

The lever 103 is preferably provided with a hand contacting portion 106 which may be of a suitable thermo-plastic material, such as Bakelite, molded about the edge of the lever 103 and arranged to protrude from the horizontal recess 105 so as to provide a smooth and comfortable handle by which the lever 103 may be rotated about its pivot pin 104. In order that movement of the lever 103 may rotate the shaft 64, I provide a link 111 extending between the lever 103 and one end of a bell crank 107 which is secured to the upper end of the shaft 64 as by means of a pair of nuts 108 and 109. The link 111 may be attached to the bell crank 107 by a pivot pin 110 and to the lever 103 by means of a pivot 112.

It will be seen that movement of the lever 103 in an inward direction with respect to the control knob 37 will move the link 111 and the bell crank 107 so as to impart a rotary motion to the shaft 64 to disengage the pawl 53 from the notches 52 in the notch plate 51. It will be further observed that the action of the spring 55 tending to restore the pawl 53 into a notch engaging position will also rotate the shaft 64 in a direction reverse to that just described so as to return the lever 103 to a non-operated position.

Figure 8:
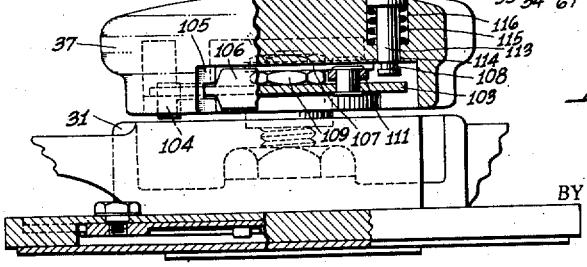
Fig. 8 is an elevational view partly in section taken as indicated by the line VIII—VIII of Fig. 6 and showing the construction of a locking device employed for locking the aforementioned release mechanism in the released position.

For the reasons hereinbefore stated, I prefer to arrange the mechanism so that the protractor release device may be locked in a released position. This may be accomplished, as illustrated in Figs. 6 and 8, by the employment of a locking plunger 113 which is slidably mounted in a hole 114 and normally urged upwardly by means of a spring 115 contained in a recess 116 provided in the control knob 37 and confined between the bottom of the recess 116 and a knob or thumb piece 117 affixed to the upper end of the locking plunger 113. The locking plunger 113 is provided at its lower end with an annular recess 118, the plunger being located in such a position as to lie directly over a notch 119 provided in the outer edge of the lever 103 when said lever is moved to its operated position.

It will be observed that should the plunger 113 be depressed when the lever 103 is moved inward to its operated position, the lower end of the plunger 113 will be inserted into the notch 119 provided in the plate 103 and thereby prevent the outward movement of the lever 103 as a result of the force of the spring 55. The annular recess 118 is made with a width slightly in excess of the thickness of the lever 103 so that when the plunger 113 is depressed with the lever 103 in its operated position and the lever 103 is then released, the side of the notch 119 provided therein will engage the annular recess 118 and prevent the spring 115 from moving the plunger 113 upwardly to release the lever 103.

It will be observed therefore that this operation will lock the lever 103 and the pawl 53 connected thereto in a disengaged position with respect to the locking plate 51. It will be further observed that in order to release the locking plunger 113 it is only necessary to move the lever 103 in the releasing direction and thereby disengage the edge of the notch 119 from the annular recess 118 to allow the spring 115 to move the locking plunger 113 upwardly into a disengaged position. This type of protractor head may also include the clamping device 75b and the bottom cover plate 75.

Figure 9:
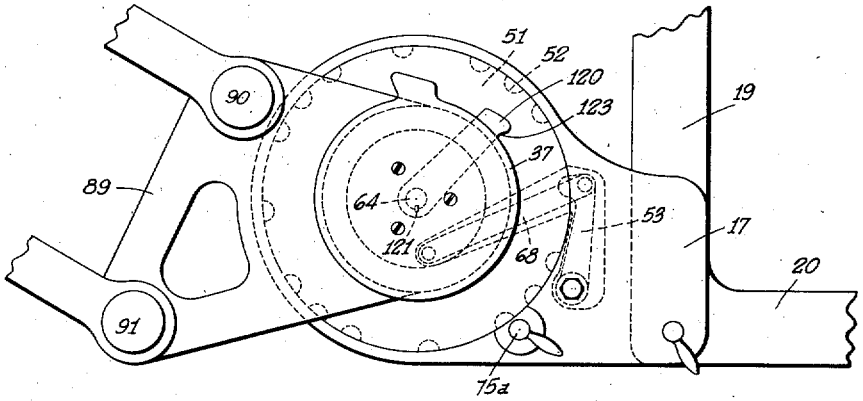
Fig. 9 is a plan view illustrating a still further modified form of protractor release mechanism.
Figure 12:
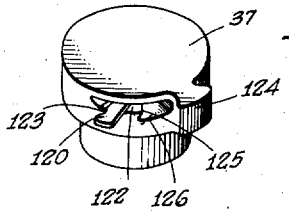
Fig. 12 is a fragmentary perspective view showing the construction and inter-relationship of the control knob and release lever employed in the form of my invention which is illustrated in Fig. 9.

I have illustrated in Figs. 9 and 12 an alternative method of operating the release mechanism for the protractor head as including a lever 120 which may be used to rotate the shaft 64 and thereby actuate the pawl 53. As illustrated in these figures, I prefer to attach the lever 120 to the shaft 64 as by means of a suitable key 121 engaging the lever 120 and the shaft 64. The lever 120 is arranged to protrude through a suitable slot 122 provided in the periphery of the control knob 37 so as to have the end thereof disposed exteriorly of said knob and be readily accessible to a draftsman employing this machine. I provide a notch or finger recess 123 in one side of the lever 120 near the protruding end thereof and provide a boss or protuberance 124 on the periphery of the control knob 37 so that the lever 120 may be actuated by an operator thereof placing a thumb to the left of the boss 124 and a finger to the right of the lever 120 to engage the recess 123 provided therein and moving the lever 120 toward the boss 124 by exerting pressure between the thumb and finger. Inasmuch as the lever 120 is keyed to the shaft 64, it will be observed that such operation will rotate the shaft 64 and effect the disengagement of the pawl 53 from the notch plate 51 in the manner previously described. It is, of course, apparent that the action of the spring 55 tending to move the pawl into engagement with the notches 52 provided in the notch plate 51 will restore the lever 120 to its non-operated position whenever it is released by the draftsman.

In order that the lever 120 may be locked in an operated position corresponding to the released position of the protractor head, I prefer to form the previously described slot 122 which is provided in the periphery of the control knob 37 with a J or bayonet shape which includes a toe portion 125. I prefer to make the lever 120 of relatively thin and resilient material so that when moved to the operated position it may be deflected or sprung downwardly to engage the toe portion 125 of the J slot and be held thereby in the operated position corresponding to the released position of the protractor head.

I prefer to form the toe portion 125 of the J shaped slot 122 with an undercut portion 126 adapted to receive the lever 120 when it is pressed into the locked position so as to prevent the resilience of the lever 120 from disengaging said lever from the toe portion of the J slot.

Figure 10:
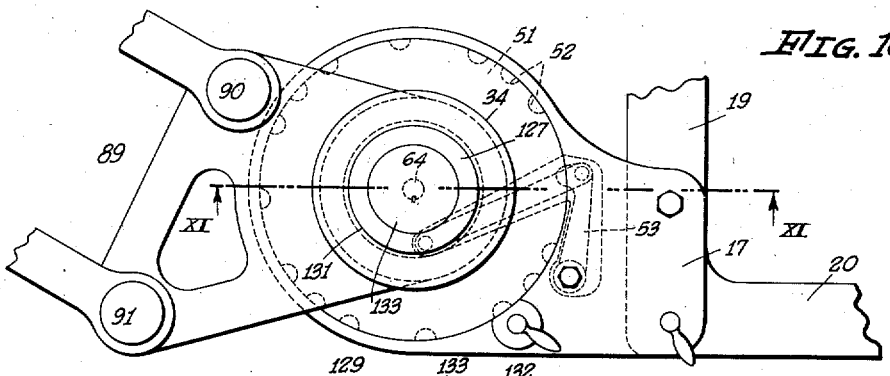
Fig. 10 is a plan view similar to Fig. 9 showing an additional modification of the release mechanism of my invention.
Figure 11:
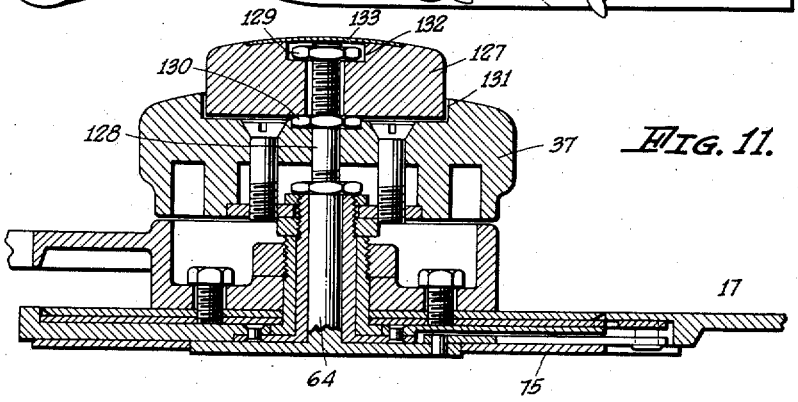
Fig. 11 is a vertical sectional view taken as indicated by the line XI—XI of Fig. 10 and illustrating the details of construction of this form of release mechanism.

In Figs. 10 and 11, I have illustrated another alternative form of the protractor releasing mechanism of my invention which will find favor in those applications where a lever protruding from the side of the control knob 37 is undesirable. In this modification, I prefer to effect the release of the pawl 53 from the notch plate 51 in the manner previously described; namely, by rotating the shaft 64. In this form of my invention I prefer to accomplish this by means of an auxiliary control knob 127 which may be attached to an extension 128 of the shaft 64 by means of nuts 129 and 130 positioned above and below the knob 127. I prefer to fit the knob 127 into a recess 131 provided in the upper surface of the control knob 37 and to provide a finished exterior appearance of the auxiliary control knob 127 by including the nut 129 within a recess 132 and affixing a snap cover 133 thereabove.

It will be observed in this form of my invention that the auxiliary control knob 127 is placed in a position where it may be readily and easily manipulated by a draftsman employing this machine regardless of the position to which the protractor head may be moved.

It should be noted that in each of the modifications of the mechanism of my invention which I have illustrated herein, the scales 21 and 22 and the head plate 17 to which they are affixed are positioned below the lowermost portion of the mechanism attached to the parallel mechanism regardless of whether said parallel mechanism is of the endless band type or of the parallel arm type, and that as a result of this construction the scales may be moved to any desired position in a full circle without interfering or coming into contact with said parallel mechanism.

It will also be noted that I have provided a number of types of release devices for the protractor head, each of which overcomes the primary disadvantages found in drafting machines in current use today; that is to say, that each of the release mechanisms which I have provided is so positioned and of such type as to be readily operable by a draftsman using the machine without requiring that the draftsman employ both hands for this operation, the devices of my invention each being readily manipulated in conjunction with the operation of rotating the protractor head by means of the same hand which is employed to effect said rotation. I have also provided a means for locking said mechanisms in their released position, said means being readily actuated by the same hand of the operator as is employed to operate the release mechanism and to rotate the protractor head assembly.

While I have shown and described the preferred embodiment of my invention, I do not desire to be limited to any of the details of construction shown or described herein, except as defined in the appended claims.

I claim:

1. A drafting machine comprising a supporting head adapted for free movement above a drawing board in a plane parallel thereto, frame means extending below and rotatably supported by said head, means for maintaining said frame in fixed angular relation with respect to said board irrespective of movement of said head and frame over said board, a drafting tool below said head, means rotatably supporting said drafting tool from said head, a handle positioned above said head and secured to said drafting tool for rotation therewith, releasable locking means for locking said tool against rotation with respect to said frame, control means above the level of said head for actuating said locking means, in which said locking means comprises a pawl on said tool movable into and out of engagement with a portion of said frame, means guiding said pawl for movement in a fixed path toward and away from said frame, shaft means rotatable with respect to said frame and handle and extending therebetween, means adjacent said handle for rotating said shaft relative to the handle, and means for moving said pawl between released and engaged positions in response to rotary movement of said shaft.

2. A drafting machine comprising a supporting head adapted for free movement above a drawing board in a plane parallel thereto, frame means extending below and rotatably supported by said head, means for maintaining said frame in fixed angular relation with respect to said board irrespective of movement of said head and frame over said board, a drafting tool below said head, means rotatably supporting said drafting tool from said head, a handle positioned above said head and secured to said drafting tool for rotation therewith, releasable locking means for locking said tool against rotation with respect to said frame, control means above the level of said head for actuating said locking means, in which said locking means comprises a pawl on said tool movable into and out of engagement with a portion of said frame, means guiding said pawl for movement in a fixed path toward and away from said frame, shaft means rotatable with respect to said frame and handle and extending therebetween, means adjacent said handle for rotating said shaft relative to the handle, a mechanism for transmitting rotary motion of said shaft into reciprocating motion of said pawl, and spring means urging said pawl into locking position.

3. A drafting machine comprising a supporting head adapted for free movement above a drawing board in a plane parallel thereto, frame means extending below and rotatably supported by said head, means for maintaining said frame in fixed angular relation with respect to said board irrespective of movement of said head and frame over said board, a drafting tool below said head, means rotatably supporting said drafting tool from said head, a handle positioned above said head and secured to said drafting tool for rotation therewith, releasable locking means for locking said tool against rotation with respect to said frame, control means above the level of said head for actuating said locking means, in which said locking means comprises a pawl on said tool movable into and out of engagement with a portion of said frame, means guiding said pawl for movement in a fixed path toward and away from said frame, shaft means rotatable with respect to said frame and handle and extending therebetween, means adjacent said handle for rotating said shaft relative to the handle, a mechanism for transmitting rotary motion of said shaft into reciprocating motion of said pawl, spring means urging said pawl into locking position, a notched disk included in said frame member having notches at predetermined angular spacings thereon into which said pawl fits to positively restrain said tool in predetermined angular posiitons with respect to said frame, said pawl being slidable on said disk between said notches therein, whereby said spring members are effective to automatically engage said pawl with a notch in said disk when said notch reaches said pawl.

4. A drafting machine comprising a supporting head adapted for free movement above a drawing board in a plane parallel thereto, frame means extending below and rotatably supported by said head, means for maintaining said frame in fixed angular relation with respect to said board irrespective of movement of said head and frame over said board, a drafting tool below said head, means rotatably supporting said drafting tool from said head, a handle positioned above said head and secured to said drafting tool for rotation therewith, releasable locking means for locking said tool against rotation with respect to said frame, control means above the level of said head for actuating said locking means, in which said locking means comprises a pawl on said tool movable into and out of engagement with a portion of said frame, means guiding said pawl for movement in a fixed path toward and away from said frame, shaft means rotatable with respect to said frame and handle and extending therebetween, gear teeth on said shaft, a rack engaging therewith and extending transversely in said handle for rotating said shaft, and means for moving said pawl between released and engaged positions in response to rotary movement of said shaft.

5. A drafting machine comprising a supporting head adapted for free movement above a drawing board in a plane parallel thereto, frame means extending below and rotatably supported by said head, means for maintaining said frame in fixed angular relation with respect to said board irrespective of movement of said head and frame over said board, a drafting tool below said head, means rotatably supporting said drafting tool from said head, a handle positioned above said head and secured to said drafting tool for rotation therewith, releasable locking means for locking said tool against rotation with respect to said frame, control means above the level of said head for actuating said locking means, in which said locking means comprises a pawl on said tool movable into and out of engagement with a portion of said frame, means guiding said pawl for movement in a fixed path toward and away from said frame, shaft means rotatable with respect to said frame and handle and extending therebetween, gear teeth on said shaft, a cylindrical rack engaging therewith and extending transversely in said handle for rotating said shaft, said rack being rotatable in said handle, and means for locking said rack against longitudinal movement with respect to said handle in response to rotation of said rack in said handle.

6. In a drafting machine, the combination of: a drafting head supported for free translatory movement relative to a drawing board in a plane parallel thereto; means for maintaining said head in a fixed angular position relative to said drawing board irrespective of said translatory movement; a drafting tool disposed below said head; pivot means mounting said drafting tool on said head for free rotation thereabout; a handle secured to said pivot means and disposed above said head for manually rotating said drafting tool; a pawl on said tool; means mounting said pawl for movement into and out of engagement with said head; shaft means supported for rotary movement relative to said head and relative to said tool; means carried by said handle in a position to be operated by the same hand of an operator as is used to grasp said handle and coupled to move said rotatable shaft; and means coupling said pawl to said shaft for moving said pawl out of engagement with said head in response to movement of said shaft.

7. In a drafting machine, the combination of: a drafting head supported for free translatory movement relative to a drawing board in a plane parallel thereto; means for maintaining said head in a fixed angular position relative to said drawing board irrespective of said translatory movement; a drafting tool; pivot means rotatably supporting said drafting tool from said head; a handle secured to said pivot means for manually rotating said drafting tool; a pawl on said tool; means mounting said pawl for movement into and out of engagement with said head; spring means normally urging said pawl into engagement with said head; shaft means supported for rotary movement relative to said head and relative to said tool; means carried by said handle in a position to be operated by the same hand of an operator as is used to grasp said handle and coupled to move said rotatable shaft; and means inter-engaging said pawl and said shaft for moving said pawl out of engagement with said head in response to rotary motion of said shaft.

8. In a drafting machine, the combination of: a drafting head supported for free translatory movement relative to a drawing board in a plane parallel thereto; means for maintaining said head in a fixed angular position relative to said drawing board irrespective of said translatory movement; a drafting tool; pivot means rotatably supporting said drafting tool from said head; a handle secured to said pivot means for manually rotating said drafting tool; a pawl on said tool; means mounting said pawl for movement into and out of engagement with said head; shaft means supported for rotary movement relative to said head and relative to said tool; gear teeth on said shaft; a gear rack engaging said gear teeth for moving said shaft and mounted for slidable movement in said handle in a position to be moved by the same hand of an operator as is used to grasp said handle; and means coupling said pawl to said shaft for moving said pawl out of engagement with said head in response to movement of said shaft.

9. In a drafting machine, the combination of: a drafting head supported for free translatory movement relative to a drawing board in a plane parallel thereto; means for maintaining said head in a fixed angular position relative to said drawing board irrespective of said translatory movement; a drafting tool; pivot means rotatably supporting said drafting tool from said head; a handle secured to said pivot means for manually rotating said drafting tool; a pawl on said tool; means mounting said pawl for movement into and out of engagement with said head; shaft means supported for rotary movement relative to said head and relative to said tool; means carried by said handle for moving said rotatable shaft comprising a bell crank secured to said shaft, a lever pivotally secured to said handle in a position to be moved by the same hand of an operator as is used to grasp said handle, and a link coupling said lever to said bell crank; and means coupling said pawl to said shaft for moving said pawl out of engagement with said head in response to movement of said shaft.

10. In a drafting machine, the combination of: a drafting head supported for free translatory movement relative to a drawing board in a plane parallel thereto; means for maintaining said head in a fixed angular position relative to said drawing board irrespective of said translatory movement; a drafting tool; pivot means rotatably supporting said drafting tool from said head; a handle secured to said pivot means for manually rotating said drafting tool; a pawl on said tool; means mounting said pawl for movement into and out of engagement with said head; shaft means supported for rotary movement relative to said head and relative to said tool; lever means carrried by said shaft and disposed adjacent said handle in a position to be moved by the same hand of an operator as is used to grasp said handle and coupled to rotate said shaft; and means coupling said pawl to said shaft for moving said pawl out of engagement with said head in response to movement of said shaft.

11. In a drafting machine, the combination of: a drafting head supported for free translatory movement relative to a drawing board in a plane parallel thereto; means for maintaining said head in a fixed angular position relative to said drawing board irrespective of said translatory movement; a drafting tool; pivot means rotatably supporting said drafting tool from said head; a handle secured to said pivot means for manually rotating said drafting tool; a pawl on said tool; means mounting said pawl for movement into and out of engagement with said head; shaft means supported for rotary movement relative to said head and relative to said tool; a slot in said handle; a lever secured to said shaft and extending through said slot for manually moving said shaft; and means coupling said pawl to said shaft for moving said pawl out of engagement with said head in response to movement of said shaft.

12. In combination with a drafting machine which includes a drafting head supported upon a parallel mechanism for free translatory movement relative to a drawing board in a plane parallel thereto and in a fixed angular position relative thereto having a drafting tool pivotally secured to said head for manual rotation relative thereto by a handle coupled to said tool and disposed above said head and having a device for securing said tool against pivotal movement relative to said head comprising a pawl mounted on said tool for movement between a position engaging said head and a position disengaged therefrom, a pawl control device including: shaft means supported for rotary movement relative to said head and relative to said tool; means coupling said pawl to one end of said shaft for moving said pawl between said engaged and disengaged positions in response to movement of said shaft; control means for moving said shaft carried by said handle in a position to be operated by the same hand of an operator as is used to grasp said handle and coupled to the other end of said rotatable shaft; and manually operable restraining means associated with said control means for restraining said shaft in a position corresponding to the disengaged position of said pawl.

13. In combination with a drafting machine which includes a drafting head supported upon a parallel mechanism for free translatory movement relative to a drawing board in a plane parallel thereto and in a fixed angular position relative thereto having a drafting tool pivotally secured to said head for manual rotation relative thereto by a handle coupled to said tool and disposed above said head and having a device for securing said tool against pivotal movement relative to said head comprising a pawl mounted on said tool for movement between a position engaging said head and a position disengaged therefrom, a pawl control device including: shaft means supported for rotary movement relative to said tool; means coupling said shaft to move said pawl between said engaged and said disengaged positions; gear teeth on said shaft; a gear rack; a bore in said handle slidably and rotatably receiving said gear rack for disposing said rack in a position engaging said gear teeth and in a position to be moved by the same hand of an operator as is used to grasp said handle; pin means extending into said bore; a slot in said rack for receiving the end of said pin means; and a shoulder near one end of said slot adapted to be moved into engagement with said pin means by rotary movement of said rack to restrain said rack in a position corresponding to the disengaged position of said pawl.

14. In combination with a drafting machine which includes a drafting head supported upon a parallel mechanism for free translatory movement relative to a drawing board in a plane parallel thereto and in a fixed angular position relative thereto having a drafting tool pivotally secured to said head for manual rotation relative thereto by a handle coupled to said tool and disposed above said head and having a device for securing said tool against pivotal movement relative to said head comprising a pawl mounted on said tool for movement between a position engaging said head and a position disengaged therefrom, a pawl control device including: a lever carried by said handle in a position to be engaged by the same hand of an operator as is used to grasp said handle and mounted for pivotal movement relative thereto between a securing position and a released position corresponding, respectively, to said engaged and said disengaged positions of said pawl; means coupling said lever to said pawl for moving said pawl between said engaged and said disengaged positions; plunger means carried by said handle; and means mounting said plunger means for movement from a disengaged position to an engaged position extending across the path traversed by said lever in moving from said released position to said securing position, whereby movement of said plunger to said engaged position when said lever is in said released position prevents movement of said lever to said securing position.

15. In combination with a drafting machine which includes a drafting head supported upon a parallel mechanism for free translatory movement relative to a drawing board in a plane parallel thereto and in a fixed angular position relative thereto having a drafting tool pivotally secured to said head for manual rotation relative thereto by a handle coupled to said tool and disposed above said head and having a device for securing said tool against pivotal movement relative to said head comprising a pawl mounted on said tool for movement between a position engaging said head and a position disengaged therefrom, a pawl control device including: a slot in said handle; a lever extending through said slot and mounted on said handle for pivotal movement along said slot between a securing position and a released position corresponding, respectively, to said engaged and said disengaged positions of said pawl; means coupling said lever to said pawl for moving said pawl between said engaged and said disengaged positions; and a shoulder formed in said slot near the end thereof corresponding to the released position of said lever for engaging and holding said lever in said released position.

16. In combination with a drafting machine which includes a drafting head supported upon a parallel mechanism for free translatory movement relative to a drawing board in a plane parallel thereto and in a fixed angular position relative thereto having a drafting tool pivotally secured to said head for manual rotation relative thereto by a handle coupled to said tool and disposed above said head and having a device for securing said tool against pivotal movement relative to said head comprising a pawl mounted on said tool for movement between a position engaging said head and a position disengaged therefrom, a pawl control device including: a slot in said handle; a flexible lever extending through said slot and mounted on said handle for pivotal movement along said slot between a securing position and a released position corresponding respectively, to said engaged and said disengaged positions of said pawl; means coupling said lever to said pawl for moving said pawl between said engaged and said disengaged positions; a shoulder formed in said slot near the end thereof corresponding to the released position of said lever, whereby said lever may be moved along said slot to said released position and then flexed to dispose said lever behind said shoulder and prevent a reverse movement of said lever; and an overhanging toe portion associated with said shoulder and disposed in a position to extend over said lever and hold said lever behind said shoulder.

17. In a drafting machine, the combination of: a drafting head supported for free translatory movement relative to a drawing board in a plane parallel thereto; means for maintaining said head in a fixed angular position relative to said drawing board irrespective of said translatory movement; a drafting tool; pivot means rotatably supporting said drafting tool from said head; a handle secured to said pivot means for manually rotating said drafting tool; a pawl on said tool; means mounting said pawl for movement into and out of engagement with said head; shaft means below the top of said handle supported for rotary movement relative to said head and relative to said tool; means coupling said shaft to move said pawl out of engagement with said head; a bell crank secured to said shaft; a lever carried by said handle in a position to be engaged by the same hand of an operator as is used to grasp said handle; means pivotally mounting said lever on said handle for pivotal movement inwardly and outwardly relative to said handle; recess means in the side of said handle for receiving said lever in its inward position; and a link coupling said lever to said bell crank for rotating said shaft in response to pivotal movement of said lever.

18. In a drafting machine head, in combination, a latching plate relatively fixed in orientation, a pivot pin supported in the head, a straight edge supporting frame carried by the pivot pin, a knob for manual engagement carried by the pivot pin, a latch carried by the frame and coacting with the latching plate, a shaft rotatably carried longitudinally of the pivot pin, an arm on the shaft, power storing means controlling movement of rotation of the shaft, link means between the arm and latch and a plunger in the knob operatively connected eccentrically of the shaft.

19. In a drafting machine head, in combination, means relatively fixed in orientation, a pivot pin supported in the head, a straight edge supporting frame carried by the pivot pin, a knob for manual engagement carried by the pivot pin, latching means between the frame and the relatively fixed means, a shaft supported in the head, an arm on the shaft, power storing means controlling movement of rotation of the shaft, link means between the arm and the latching means, and a plunger carried by the knob operatively connected eccentrically of the shaft to rotate said shaft.

20. In a drafting machine head, in combination, means relatively fixed in orientation, straight edge supporting means, means to releasably secure the relatively fixed means with the supporting means, coaxial members, operative connections between one of said members and the supporting means, operative connections between the other of said members and the releasable securing means and means to selectively actuate the respective coaxial members.

21. In a drafting machine, in combination, means relatively fixed in orientation, straight edge supporting means, means to releasably secure the relatively fixed means with the supporting means, coaxial members, operative connections between one member and the supporting means, operative connections between the other member and the releasable means, manually actuatable means to actuate one member and a second manually actuatable means to actuate the other member.

22. In a drafting machine, in combination, means relatively fixed in orientation, straight edge supporting means, means to releasably secure the relatively fixed means with the supporting means, coaxial means comprising a first member and a second member, operative connections between the first member and the supporting means, operative connections between the second member and the releasable means, a knob to actuate the first member and a plunger carried by the knob to actuate the second member.

23. In a drafting machine head, in combination, means relatively fixed in orientation, straight edge supporting means, means to releasably secure the relatively fixed means with the supporting means, a pivot pin supported in the head, said straight edge supporting means being carried by the pivot pin, a knob for manual engagement carried by the pivot pin, a shaft rotatably carried in the head, actuating connections between the shaft and the latching means, reciprocating means carried by the knob and operative connections between the reciprocating means and the shaft.

24. In a drafting machine head, in combination, a member relatively fixed in orientation, a straight edge supporting frame, means to mount said frame for rotation below and with reference to said member, a tubular pivot pin passing through said member, means to fix said pivot pin to said frame, a hand knob above said member, means to fix said knob to said pivot pin, means for latching said frame to said member, a shaft through said pivot pin controlling said latching means, and means carried by said knob to actuate said controlling shaft.

25. In a drafting machine head, in combination, a member relatively fixed in orientation, a straight edge supporting frame mounted for rotation below and with reference to said member, a tubular pivot pin extending through said member and fixed to said frame, a hand knob above said member and fixed to said pivot pin, means for latching said frame to said member, a shaft through said pivot pin controlling said latching means, a lever on said shaft and means carried by said knob to rotate said lever.

26. In a drafting machine head, in combination, a belt pulley relatively fixed in orientation, a straight edge supporting frame mounted for rotation below and with reference to said pulley, a latching plate carried by said pulley, a tubular pivot pin rotating within the pulley and fixed to said frame, a hand knob above said pulley and carried by the pivot pin, means on said frame for latching said frame to said latching plate, a shaft through said pivot pin controlling said latching means and means carried by said knob to actuate said controlling shaft.

27. In a drafting machine head, in combination, a member relatively fixed in orientation, a pivot pin provided with a passage supported in the head, a straight edge supporting frame carried by the pivot pin, a knob for manual engagement carried by the pivot pin, a shaft carried in the passage of the pivot pin, latching means between the member relatively fixed in orientation and the frame, means on the shaft at the end adjacent the frame for operating the latching means, and means at the knob end of said shaft for actuating said shaft.

28. In a drafting machine head, in combination, a member relatively fixed in orientation, a pivot pin provided with a passage supported in the head, a straight edge supporting frame carried by the pivot pin, a knob for manual engagement carried by the pivot pin, a rotatable shaft carried in the passage of the pivot pin, latching means between the member relatively fixed in orientation and the frame, means on the shaft at the end adjacent the frame for operating the latching means, and means at the knob end of said shaft for rotating said shaft.

29. In a drafting machine, in combination, means relatively fixed in orientation, straight edge supporting means, means to releasably secure the relatively fixed means with the supporting means, coaxial means comprising a first member and a second member, operative connections between the first member and the supporting means, operative connections between the second member and the releasable securing means, a knob to actuate the first member, an arm fixed on the second member and a plunger pivoted to the arm within the knob and extending therewithout for manual engagement to actuate the second member.

30. In a drafting machine head, in combination, means relatively fixed in orientation, a straight edge supporting means rotatably mounted on the head, a hand knob to rotate the straight edge supporting means, a latching plate carried by one of said means, a latch lever pivotally carried by the other of said means and coacting with the plate, a reciprocating member operatively connected with the latch lever, a manually actuatable means carried by the knob extending beyond the horizontal circumference of the knob and movable along said circumference and operative connections between the circumferentially movable member and the reciprocating member converting the circumferential movement of the circumferentially movable member into a movement of translation of the reciprocating member whereby the latch is actuated.

31. In a drafting machine head, in combination, means relatively fixed in orientation, straight edge supporting means rotatably mounted on the head, a hand knob to rotate the straight edge supporting means, a latching plate carried by one of said means, a latch lever pivotally carried by the other of said means and coacting with the plate, power storing means to urge the latching lever into coacting relationship with the plate, a reciprocating member operatively connected with the latch lever, a manually actuatable means carried by the knob extending beyond the horizontal circumference of the knob and movable along said circumference and operative connections between the circumferentially movable member and the reciprocating member converting the circumferential movement of the circumferentially movable member into a movement of translation of the reciprocating member whereby the latch is actuated.

VARD B. WALLACE.